US007935294B2

(12) United States Patent
Zander et al.

(10) Patent No.: US 7,935,294 B2
(45) Date of Patent: May 3, 2011

(54) REDUCED DENSITY FOAM AND METHOD FOR MOLDING REDUCED DENSITY FOAM

(75) Inventors: Robert J. Zander, Troy, MI (US); Richard Kucejko, Troy, MI (US); Michael P. Williams, II, Bloomfield Hills, MI (US)

(73) Assignee: Cadillac Products Automotive Company, Troy, MI (US)

( * ) Notice: Subject to any disclaimer, the term of this patent is extended or adjusted under 35 U.S.C. 154(b) by 467 days.

(21) Appl. No.: 11/392,842

(22) Filed: Mar. 29, 2006

(65) Prior Publication Data

US 2007/0235892 A1  Oct. 11, 2007

(51) Int. Cl.
*B29B 7/00* (2006.01)
(52) U.S. Cl. ............. 264/328.8; 264/328.19; 264/328.17
(58) Field of Classification Search ................ 264/328.8, 264/328.17, 328.18
See application file for complete search history.

(56) References Cited

U.S. PATENT DOCUMENTS

| | | | | | |
|---|---|---|---|---|---|
| 2,478,013 | A | * | 8/1949 | Roddy | 264/349 |
| 2,629,132 | A | * | 2/1953 | Willcox et al. | 425/578 |
| 3,695,800 | A | * | 10/1972 | Hutchinson et al. | 425/146 |
| 3,937,447 | A | * | 2/1976 | Alwes et al. | 366/79 |
| 4,155,969 | A | * | 5/1979 | Hendry | 264/45.1 |
| 4,795,336 | A | * | 1/1989 | Shannon et al. | 425/145 |
| 5,052,909 | A | * | 10/1991 | Hertzer et al. | 425/150 |
| 5,123,833 | A | * | 6/1992 | Parker | 425/557 |
| 5,545,366 | A | * | 8/1996 | Lust et al. | 264/225 |
| 5,591,385 | A | * | 1/1997 | Arai et al. | 264/40.6 |
| 5,645,868 | A | * | 7/1997 | Reinhart | 425/145 |
| 6,120,277 | A | * | 9/2000 | Klaus | 425/145 |
| 6,514,440 | B1 | * | 2/2003 | Kazmer et al. | 264/39 |
| 7,291,297 | B2 | * | 11/2007 | Weatherall et al. | 264/40.1 |
| 2003/0108638 | A1 | * | 6/2003 | Neter et al. | 425/547 |
| 2003/0122272 | A1 | * | 7/2003 | Smith et al. | 425/145 |
| 2003/0203064 | A1 | * | 10/2003 | Doughty et al. | 425/145 |
| 2004/0037915 | A1 | * | 2/2004 | Dantlgraber | 425/589 |
| 2005/0258795 | A1 | * | 11/2005 | Choi | 318/625 |

* cited by examiner

*Primary Examiner* — Yogendra N Gupta
*Assistant Examiner* — Jeremiah Smith
(74) *Attorney, Agent, or Firm* — Harness, Dickey & Pierce, P.L.C.

(57) ABSTRACT

A system and method for operating an injection system to create a reduced density polymeric component uses a resin/blowing agent mixture, an injection molding machine having an injection molding screw positioned in a screw section, accumulators, a hydraulic pump, multiple molds, and a cooling system. Coolant is directed into each mold. The injection molding screw is rotated moving the mixture proximate to a receiving portion of the screw section. The injection molding screw is incrementally displaced to one of a plurality of successive injection positions each injecting a portion of the mixture into one of the molds by operating the hydraulic pump and discharging the accumulators. The accumulators are recharged after each injection molding screw displacement using the hydraulic pump. The injection molding screw is displaced and the accumulators recharged for each of the successive injection positions, each defining a stage for filling the molds in a single operating cycle of the injection system.

12 Claims, 4 Drawing Sheets

REDUCED DENSITY FOAM AND METHOD FOR MOLDING REDUCED DENSITY FOAM

FIELD

The present disclosure relates to reduced density polymeric foam materials and methods for molding reduced density foam material.

BACKGROUND

The statements in this section merely provide background information related to the present disclosure and may not constitute prior art.

Polymeric foamed elements are traditionally made by placing polymeric beads within a mold cavity and passing steam through the mold cavity to melt the beads together to form the element. This process is commonly referred to as steam chest molding. Steam chest molding has several drawbacks. For example, the foam bead material is expensive, thereby increasing the finished part cost. Due to the amount of time required to first melt all of the bead material and subsequently to cool both the foam material and the mold, mold cycle time is long, up to about ten minutes or longer. Lengthy mold cycle time further increases the per part cost and decreases production efficiency.

A process wherein liquid polymer is poured into a mold is also known to form foamed material. This process involves mixing two liquefied component parts, typically a base polymer and a catalyst. The liquid foam mixture is poured into a mold and the part is allowed to solidify before removal from the mold. A chemical reaction occurs when the two component parts are mixed, resulting in expansion and hardening of the material. This process is suitable for use in open, simple part molds, but may not be suitable to form complex geometric part shapes because the expanding material may not enter or fill all cavities of the mold. There are also limitations in the foamed material made in this manner due to the inherent material and process limitations.

An injection molding process offers advantages over the steam chest molding and pouring processes. A broader and therefore less expensive range of resin materials can be used with the injection molding process and a more complex part geometry can be obtained, including the use of apertures and ribs to reduce material thickness and vary part stiffness. Several drawbacks exist, however, for current injection molding processes. When reduced density foam parts are required, a gas or a blowing agent is injected with the polymeric material. If the part density is to be reduced by 50% or more, injection times of less than one second are commonly required. To achieve these injection times, a very large molding machine of approximately 3000 to 4000 tons capacity is required to inject approximately 3 to 4 pounds of material into a mold. In addition to the expense of a large capacity molding machine, the shot size is very small relative to the molding machine capacity, resulting in excess wasted material in the injection barrel between shots, as well as degradation with respect to its foaming capability. Further, a large capacity hydraulic system is required to operate the large capacity molding machine, resulting in still further increased costs per part. Still further, the screw must accelerate and decelerate very rapidly, and as the screw mass increases, the difficulty in obtaining accurate shot volumes increases.

SUMMARY

According to several embodiments of the present disclosure, a foam part injection system includes an injection molding machine having an injection molding screw operable to inject a foamed polymeric mixture. A hydraulic system is connected to the injection molding machine. The hydraulic system includes a plurality of hydraulic accumulators alignable in fluid communication with the injection molding screw. A hydraulic pump is alignable with the hydraulic accumulators and the hydraulic pump is operable to each of displace a volume of hydraulic fluid to displace the injection molding screw and refill the hydraulic accumulators. A plurality of part molds are in fluid communication with the injection molding screw. A control system operates to direct displacement of the injection molding screw in multiple successive stages. Displacement of the injection molding screw to each of the stages is assisted by flow from the hydraulic pump and each of the stages define an initially fully charged condition of the accumulators. Each of the stages corresponds to a partial volume of the mixture and a displacement of the injection molding screw required to fill one of the part molds in approximately 0.5 seconds.

According to additional embodiments, a method for creating foamed polymeric parts using a resin/blowing agent mixture, an injection molding machine having an injection molding screw, a plurality of accumulators, a hydraulic pump, and a plurality of molds includes heating the resin/blowing agent mixture. The method further includes rotating the injection molding screw to position the resin/blowing agent mixture for injection. The method also includes performing a first stage operation including operating the hydraulic pump in combination with discharging the accumulators to displace the injection molding screw from an initial position to a first injection position operable to inject a first portion of the resin/blowing agent mixture into a first one of the molds. Still further, the method includes recharging the accumulators. The method yet further includes executing a second stage operation including further operating the hydraulic pump in combination with discharging the accumulators to displace the injection molding screw from the first injection position to a second injection position operable to inject a second portion of the resin/blowing agent mixture into a second one of the molds.

According to still other embodiments, a method for operating an injection system to create a reduced density polymeric component uses a resin/blowing agent mixture, an injection molding machine having an injection molding screw positioned in a screw section, accumulators, a hydraulic pump, multiple molds, and a cooling system. Coolant is directed into each mold. The injection molding screw is rotated positioning the mixture for injection into the molds. The injection molding screw is incrementally axially translated to one of a plurality of successive injection positions each injecting a portion of the mixture into one of the molds by operating the hydraulic pump and discharging the accumulators. The accumulators are recharged after each injection molding screw displacement using the hydraulic pump. The injection molding screw is axially displaced and the accumulators recharged for each of the successive injection positions, each defining a stage for filling all the molds in a single operating cycle of the injection system.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
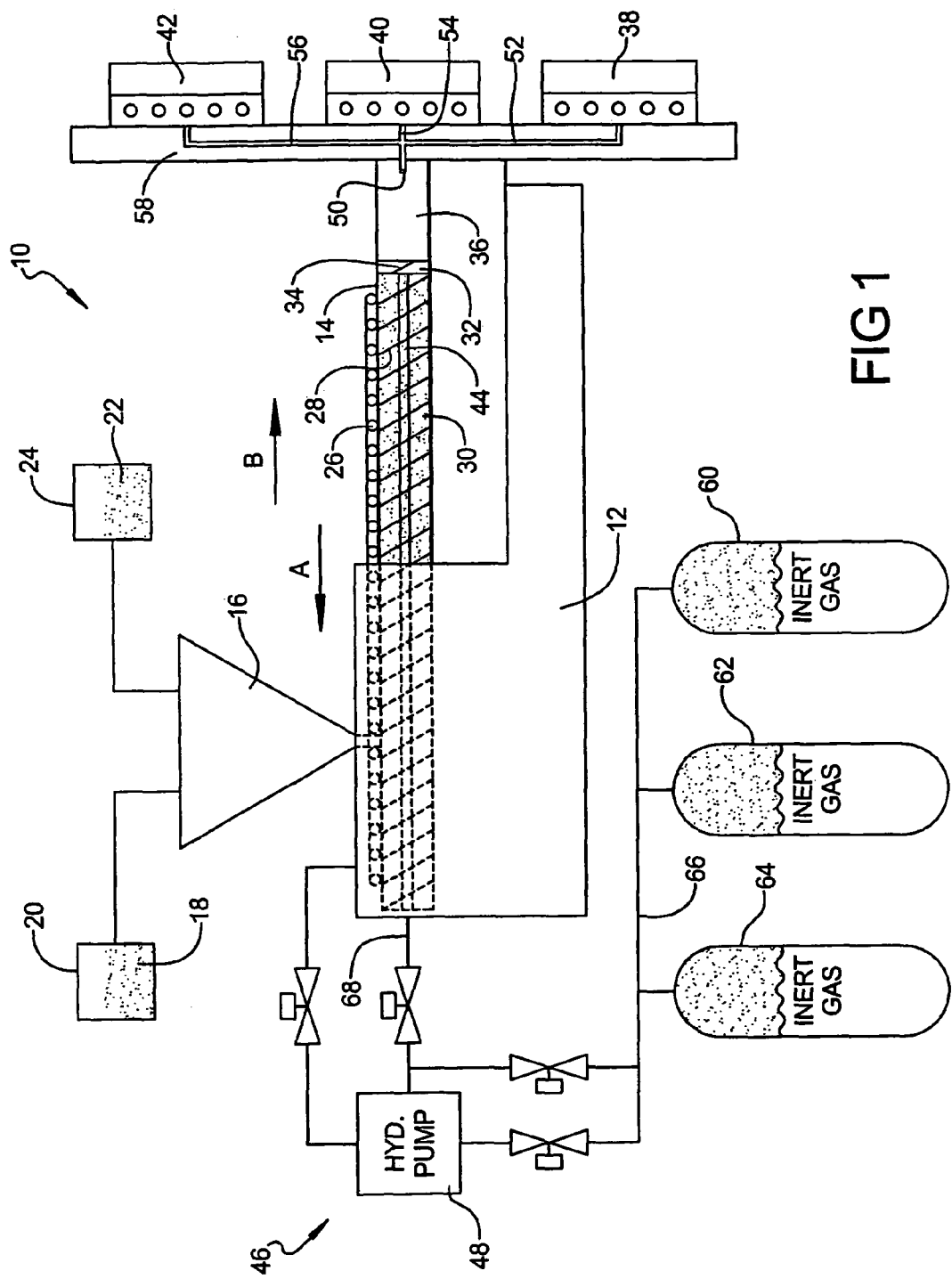
FIG. 1 is a diagrammatic view of an injection molding system operable to create the reduced density foam and carry out the method for molding the reduced density foam according to several embodiments of the present disclosure.

The following description is merely exemplary in nature and is not intended to limit the present disclosure, application, or uses. It should be understood that throughout the drawings, corresponding reference numerals indicate like or corresponding parts and features.

According to several embodiments of the present disclosure and referring generally to FIG. 1, an injection molding system 10 includes an injection molding machine 12 having a screw section 14 which is connected to a mixing chamber 16. A resin material 18 provided for example as resin beads from a resin reservoir 20 is transferred to mixing chamber 16 along with a blowing agent 22 provided from a blowing agent reservoir 24. Resin 18 and blowing agent 22 are mixed, by predetermined weights and/or by volume percentages, within mixing chamber 16 and transferred as a volume of resin and blowing agent to screw section 14. Resin material 18 can be one of a plurality of polymeric materials, including LLDPE, LDPE, TPO, Polypropylene, Ionomer, acrylonitrile styrene (ABS), polystyrene, or other polymeric materials.

A heating device is connected to screw section 14. A screw thread 28 is created on an injection molding screw 32 and both screw thread 28 and injection molding screw 32 are rotatably and axially received within screw section 14. Cavities between the thread peaks of screw thread 28 receive the volume of resin 18 and blowing agent 22. Injection molding screw 32 is initially positioned by axial displacement in a retraction direction "A" as shown in FIG. 1 as the volume of resin 18 and blowing agent 22 is received in screw section 14. The volume of resin 18 and blowing agent 22 is axially displaced using screw thread 28 by rotation of injection molding screw 32. A resin/blowing agent mixture 30 is created by heating the volume of resin 18 and blowing agent 22 in screw section 14 using heating device 26, and is liquefied under pressure to prevent gases produced by the blowing agent 22 from expanding the mixture prematurely. The resin/blowing agent mixture 30 is transferred through a one-way valve flow device which in several embodiments is a check valve 34 into a mixture receiving portion 36 of screw section 14 by continued rotation of screw thread 28. The check valve 34 is oriented to permit flow of the resin/blowing agent mixture in the receiving portion of the screw section only toward the plurality of molds. As mixture 30 enters mixture receiving portion 36, mixture 30 assists in axially translating injection molding screw 32 in the retraction direction "A".

Following heating to create mixture 30 which creates a predetermined volume of mixture 30 in mixture receiving portion 36, rotation of injection molding screw 32 is stopped and injection molding screw 32 is thereafter axially translated in an injection direction "B" to inject mixture 30. From mixture receiving portion 36, mixture 30 can be injected individually and in sequential ordered steps into each of a first, second and/or third mold 38, 40, 42. The specific order that first, second or third mold 38, 40, 42 is filled is not critical to the present disclosure, and can vary by a predetermined programming order at the discretion of the user. The quantity of molds can also vary from a minimum of two to greater than three molds at the discretion of the user. The present disclosure can also apply to a single mold, however the benefits of filling multiple molds in individual stages from a single volume of mixture 30 in a single operation or cycle will not be realized. A screw body 44 having a predetermined diameter defines the root diameter of screw thread 28 and therefore the spacing filled by the volume of resin 18 and blowing agent 22 from the root diameter to the inner wall of screw section 14. Backflow (toward retraction direction "A") of mixture 30 during injection is prevented by the orientation of check valve 34.

To both rotate screw thread 28 and axially displace injection molding screw 32 in the injection direction "B", a hydraulic system 46 is provided having a hydraulic pump 48. Fluid pressure created by hydraulic pump 48 directs injection molding screw 32 to displace the mixture 30 in mixture receiving portion 36 through an injection port 50 into each of a first, second and/or third injection header 52, 54, and 56. First, second and third injection headers 52, 54, 56 are each connected to individual ones of the first, second and third molds 38, 40, and 42 respectively and flow to any individual one of first, second, or third molds 38, 40, 42 is controlled by opening or closing a plurality of valve gates which will be described in reference to FIG. 3. Each of the first, second and third molds 38, 40, 42 are rigidly supported on a mold support member 58 which also supports each of the first, second, third injection headers 52, 54, 56.

In several embodiments, hydraulic system 46 includes a plurality of accumulators which can include a first, second and third accumulator 60, 62, 64. Hydraulic fluid of each of the first, second and third accumulators 60, 62, 64 is all transferred through an accumulator header 66. Hydraulic fluid in each of the first, second and third accumulators 60, 62, 64 as well as hydraulic fluid discharged by hydraulic pump 48 is directed through a hydraulic injection header 68 to rotate injection molding screw 32 and/or control the axial position of injection molding screw 32. It is noted that the quantity of accumulators can vary from the quantity of three identified herein. The quantity of accumulators is predetermined at least in part by the size of the injection molding machine 12, the quantity and volume of molds, and the capacity of hydraulic pump 48. A minimum of one accumulator can be used, however, multiple accumulators can provide a more rapid displacement of injection molding screw 32. The hydraulic pump 48 and the accumulators 60, 62, 64 are sized to permit the recharging step to be accomplished in a time period of approximately 1 to 5 seconds.

Figure 2:
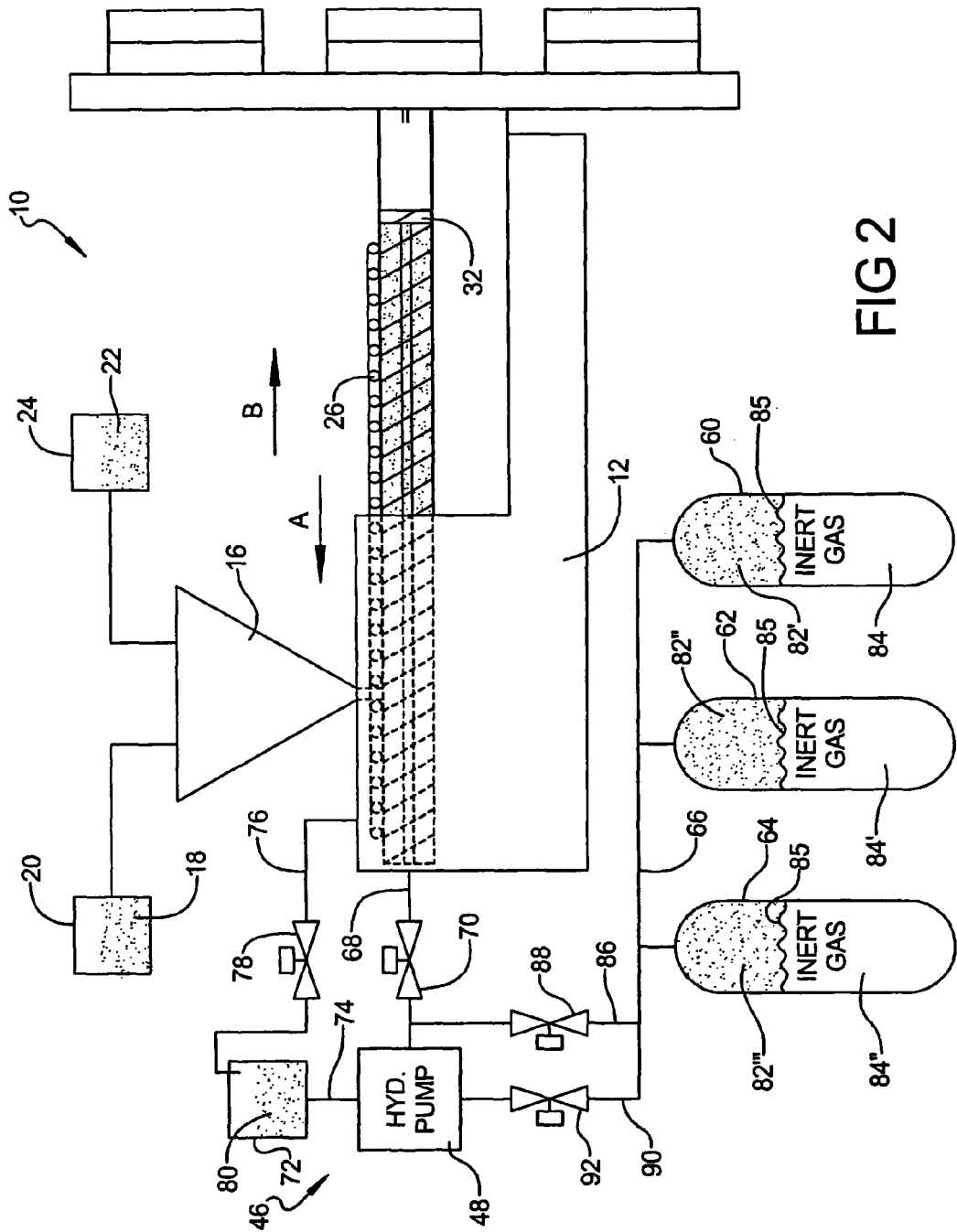
FIG. 2 is a partial diagrammatic view of FIG. 1, further identifying connections to a hydraulic system and accumulators of the present disclosure.
Figure 3:
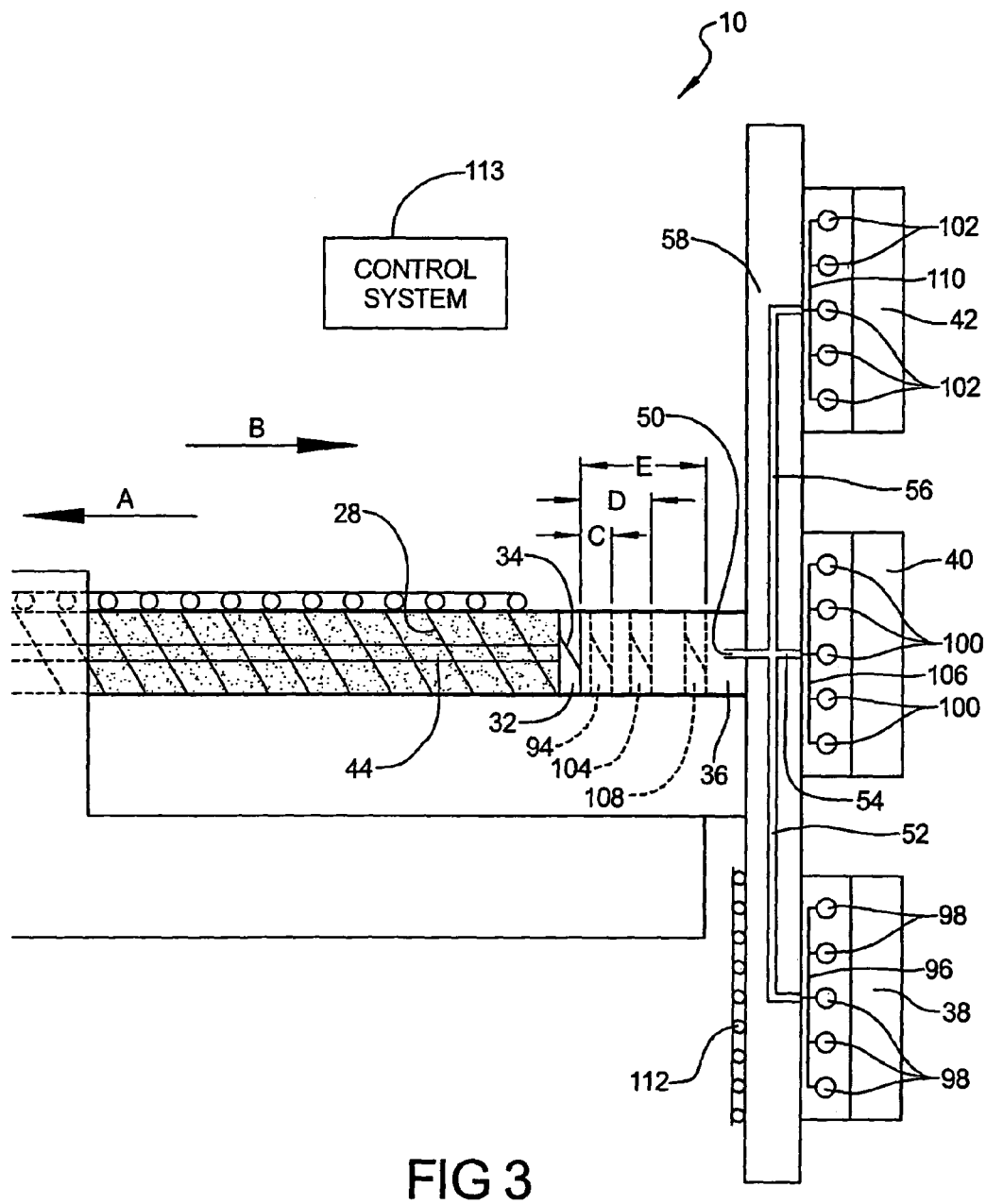
FIG. 3 is a partial diagrammatic view of the injection system of FIG. 1, further identifying a three-mold system of the present disclosure.

Referring now generally to FIGS. 2 and 3, further items of hydraulic system 46 can include a header flow control valve 70 which is electrically operable to isolate and/or throttle the flow of hydraulic fluid through hydraulic injection header 68. Hydraulic fluid can be transferred to hydraulic pump 48 from a hydraulic fluid reservoir 72 via a hydraulic fluid feed line 74. Following use of the hydraulic fluid to operate injection molding screw 32, the hydraulic fluid is returned to hydraulic fluid reservoir 72 via a hydraulic fluid return line 76 and controlled by a return isolation valve 78. A hydraulic fluid 80 is therefore contained in a closed loop defined by hydraulic system 46.

A portion of hydraulic fluid 80 is transferred to each of the first, second and third accumulators 60, 62, 64 as accumulator hydraulic fluid 82', 82", 82'''. The first, second and third accumulators 60, 62, 64 are refilled after discharge by operation of hydraulic pump 48. The pressure of the accumulator hydraulic fluid 82', 82", 82''' is inversely controlled by a volume of inert gas 84, 84', 84" such as nitrogen in each of the accumulators 60, 62, 64 which can be isolated from the hydraulic fluid by a resilient device such as a bladder 85. As the volume of hydraulic fluid in each accumulator increases, the volume of the inert gas 84 decreases, compressing the inert gas and increasing the hydraulic fluid pressure. Hydraulic fluid is transferred from the accumulators 60, 62, 64 via accumulator header 66 to an accumulator discharge line 86. Flow in accumulator discharge line 86 can be throttled and/or isolated by an isolation valve 88. To recharge the volume of hydraulic fluid in each of the accumulators, hydraulic fluid is transferred by hydraulic pump 48 via an accumulator charging line 90 having a charging line isolation valve 92. When recharging hydraulic fluid into the accumulators 60, 62, 64, isolation valve 88 is closed. Conversely, when discharging hydraulic fluid from the accumulators 60, 62, 64 into hydraulic injection header 68, charging line isolation valve 92 is closed and isolation valve 88 is opened. The hydraulic fluid in each of the accumulators 60, 62, 64 therefore acts as an additional pressure head boosting the pressure generated by hydraulic pump 48 and increasing hydraulic pressure in hydraulic injection header 68 to increase the axial displacement speed of injection molding screw 32.

Referring now generally to FIG. 3, the operation of injection molding system 10 proceeds as follows. The mixture 30 which has been heated and liquified and transferred into mixture receiving portion 36 of screw section 14 is maintained in its liquid condition by continued operation of heating device 26. In a first stage of operation, hydraulic pressure from the hydraulic pump 48 and hydraulic pressure of the first, second and third accumulators 60, 62, 64 is used to rapidly displace injection molding screw 32 from a starting position shown in solid lines to a first injection position 94 shown in phantom. As previously noted, during axial displacement of injection molding screw 32, check valve 34 prevents backflow of mixture 30, forcing a first portion of mixture 30 into injection port 50. Injection molding screw 32 progresses between the initial position and first injection position 94 by moving through a first injection displacement "C". First injection displacement "C" substantially corresponds to a first portion or volume of mixture 30 required to fill first mold 38, allowing for expansion of mixture 30 due to blowing agent 22.

The time required to axially displace injection molding screw 32 from the initial position to first injection position 94 is less than one second and in several embodiments is approximately 0.3 to 0.7 seconds. This injection time ensures that the volume of mixture 30 required to substantially fill first mold 38 is rapidly injected, permitting the blowing agent 22 of mixture 30 to expand mixture 30 to a desired density. In several embodiments, the mixture 30 is injected to fill approximately 40% of the mold volume, and subsequent expansion of mixture 30 fills the remaining 60% of the mold providing a reduced density foam part.

As injection molding screw 32 is axially displaced to first injection position 94, the first portion of mixture 30 flows via first injection header 52 through a plurality of first mold heated manifolds 96 into first mold 38. First mold 38 also includes a plurality of first valve gates 98 which can be automatically/remotely opened or closed, permitting the first portion of mixture 30 to flow into various predetermined sections of first mold 38. The plurality of first valve gates 98 can be opened and closed independently of each other and can be opened or closed at different times with respect to each other and for either reduced or longer periods of time than the other first valve gates 98, permitting the various sections of first mold 38 to receive varying amounts of the first portion of mixture 30. This permits individual sections of first mold 38 that may require additional time for expansion of mixture 30 to receive a greater or lesser percentage of the first portion of mixture 30. Also during the first stage, mixture 30 is prevented from flowing to either second mold 40 or third mold 42 by closing each of a plurality of second valve gates 100 and a plurality of third valve gates 102 positioned in each of the second and third molds 40, 42 respectively.

Upon reaching first injection position 94, hydraulic pressure is isolated from hydraulic injection header 68 by shutting flow control valve 70. Hydraulic pump 48 operation continues and by closing isolation valve 88 and opening charging line isolation valve 92, the first, second and third accumulators 60, 62, 64 are recharged with hydraulic fluid. During the accumulator recharging process, which can require approximately 1 to 5 seconds, inert gas 84 in each of the accumulators is compressed providing the subsequent boost pressure required for the next or second stage of operation of injection molding system 10.

After recharging first, second and third accumulators 60, 62, 64, charging line isolation valve 92 is closed and both isolation valve 88 and header flow control valve 70 are opened allowing hydraulic fluid to flow again into hydraulic injection header 68. In a second stage, injection molding screw 32 is repositioned from first injection position 94 to a second injection position 104. During the second stage, axial translation of injection molding screw 32 results in a second injection displacement "D". The difference between first and second injection displacements "C" and "D" corresponds to a second portion or volume of mixture 30 required to fill second mold 40. At the start of the second stage of operation, first valve gates 98 are closed and second valve gates 100 are opened while third valve gates 102 remain in the closed position. The second portion of mixture 30 flows from mixture receiving portion 36 via injection port 50 and second injection header 54 into second mold 40, through second valve gates 100 and a plurality of second mold heated manifolds 106. Second valve gates 100 and second mold heated manifolds 106 are similar to first valve gates 98 and first mold heated manifolds 96 of first mold 38. Axial translation of injection molding screw 32 from first injection position 94 to second injection position 104 also is performed in less than one second and according to several embodiments is accomplished within a time ranging from 0.3 to 0.7 seconds.

Upon reaching second injection displacement "D" the recharging operation previously described for first, second and third accumulators 60, 62, 64 is repeated. Following accumulator recharge, hydraulic system 46 is realigned as previously noted to translate injection molding screw 32 in a third stage from the second injection position 104 to a third injection position 108. During this third stage of operation, injection molding screw 32 creates a third injection displacement "E". The difference between second and third injection displacements "D" and "E" corresponds to a third portion or volume of mixture 30 required to fill third mold 42. Also during this third stage, first valve gates 98 and second valve gates 100 are closed and the plurality of third valve gates 102 are opened allowing the third portion of mixture 30 to flow from injection port 50 through third injection header 56 and via third valve gates 102 and a plurality of third mold heated manifolds 110 into third mold 42. Third valve gates 102 and third mold heated manifolds 110 function similar to first valve gates 98 and first mold heated manifolds 96 of first mold 38. Axial translation of injection molding screw 32 from second injection position 104 to third injection position 108 also is performed in less than one second and according to several embodiments is accomplished within a time ranging from 0.3 to 0.7 seconds.

The electrically controlled hydraulic valves are individually controllable to establish at least a hydraulic injection assist flow path, a hydraulic accumulator discharge flow path in communication with the hydraulic injection assist flow path; and a hydraulic accumulator recharge flow path. The hydraulic injection assist flow path includes at least header flow control valve 70 and return isolation valve 78 together with hydraulic injection header 68, hydraulic fluid return line 76, and hydraulic fluid feed line 74. The hydraulic accumulator discharge flow path includes at least isolation valve 88, accumulator header 66, and accumulator discharge line 86. The hydraulic accumulator recharge flow path includes at least charging line isolation valve 92 and accumulator charging line 90.

During injection of mixture 30 into each of first, second and third molds 38, 40, 42 operation of a heating device 112 maintains mold support member 58, each of the first, second and third injection headers 52, 54, 56, and each of the first, second, and third mold heated manifolds 96, 106, and 110 at an elevated temperature to prevent mixture 30 from expanding or solidifying in any of the lines associated with the first, second or third molds 38, 40, 42. Once the third injection position 108 is reached, valves in hydraulic system 46 feeding injection molding screw 32 are closed and hydraulic pump 48 is operated to recharge the accumulators and the process can begin again for the first stage of operation. During refill of injection molding screw 32 with resin 18 and blowing agent 22, the portions of mixture 30 in each of the first, second and third molds 38, 40, 42 cools from the injection temperature to a temperature suitable for removal from the molds. According to several embodiments, each of the molds can receive coolant at differing temperatures so that the mixture 30 in the first mold filled will cool at substantially the same rate as the last mold filled. Once injection molding screw 32 is repositioned to the initial location, a new volume of mixture 30 can be created by transfer from mixing chamber 16 into screw section 14 and heating by heating device 26. This process can require approximately one minute and in several embodiments requires approximately 20 to 40 seconds during which time the accumulators are also recharged if necessary.

As previously noted, recharging the first, second, and third accumulators 60, 62, 64 requires approximately 1 to 5 seconds to complete. In addition to the individual mold fill times, the total time to fill each of the first, second and third molds 38, 40, 42 is therefore dependent in part on the combined recharging time to fill and discharge the second and any subsequent accumulators for each of the stages for filling the molds. It is noted that each of the first, second and third molds 38, 40, 42 can be filled using equivalent volumes of mixture 30 or the molds can be sized differently from one another and require different volumes of mixture 30. Therefore, each of the first, second and third injection displacements "C", "D" and "E" can be either equivalent to each other or can vary from each other. The timing of operation of the plurality of first, second and third plurality of valve gates 98, 100, 102 however, is controlled so each of the molds fills in less than one second and in several embodiments between 0.3 to 0.7 seconds without regard to the mold sizes. An injection cycle of the present disclosure is defined as a plurality of successive injection stages operable to fill all of the molds. Each stage includes a predetermined axial displacement of the injection molding screw 32 assisted by flow from the hydraulic pump 48 and the hydraulic accumulators 60, 62, 64 to fill one of the part molds. Each of the stages define an initially charged condition of the accumulators, and each of the stages corresponds to a partial volume of the mixture 30 operable to fill the one of the part molds in less than one second.

In several embodiments, injection molding system 10 can be operated by programming into a control system 113 having at least a computer, operational control signals for the various components of injection molding system 10, including hydraulic system 46. Control system 113 can therefore direct hydraulic fluid to displace injection molding screw 32 to one of the injection positions 94, 104, or 108, direct hydraulic fluid recharging of the accumulators 60, 62, 64, or to control a temperature or flow rate of coolant to any one of the molds 38, 40, 42 to be described below. Connection lines between control system 113 to each of the items of injection molding system 10 are not shown for clarity.

Figure 4:
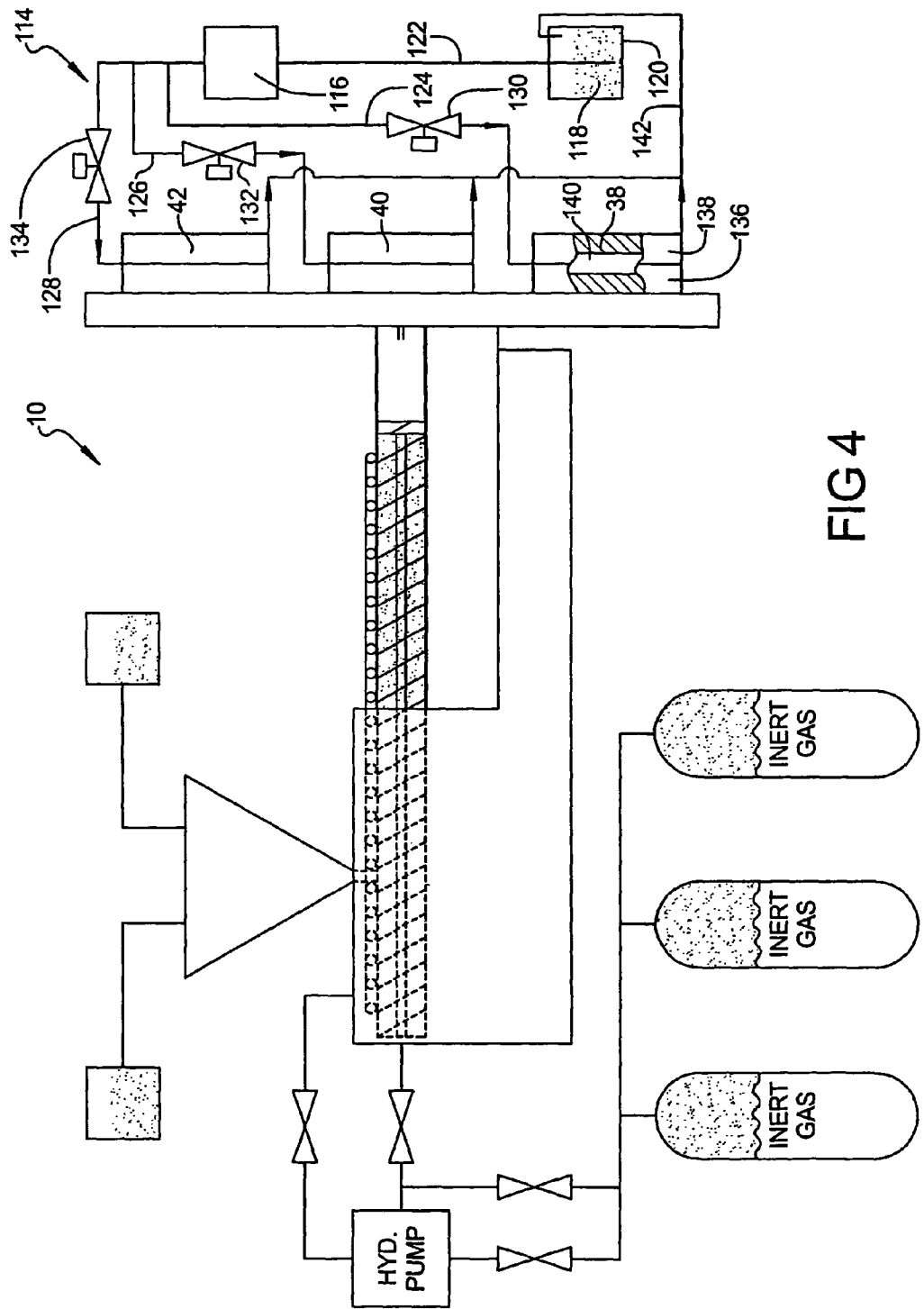
FIG. 4 is a partial diagrammatic view of the injection system of FIG. 1, further identifying a cooling system connected to the molds.

Referring now generally to FIG. 4, and according to several embodiments, during the three injection stages of the first, second and third molds 38, 40, 42 a supply of coolant is provided via a cooling system 114 to each of the first, second and third molds 38, 40, 42. The coolant can be for example chilled water or various other liquids commonly used for this purpose. Cooling system 114 includes a coolant pump 116 which pumps a coolant 118 provided from a coolant reservoir 120 via a coolant supply line 122 into each of a first, second, and third mold supply line 124, 126 and 128. Flow in each of the first, second and third mold supply lines 124, 126, 128 can be isolated or throttled via individual ones of a first, second, and third electrically controlled mold coolant isolation valve 130, 132, 134. Coolant can be provided to each of the first, second, and third molds 38, 40, and 42. First, second, and third molds 38, 40, and 42 can be each divided into a first mold portion 136 and a second mold portion 138 which are closed during the injection process and opened to remove a finished part 140. Once the individual injection stages are complete the flow of coolant 118 through the individual molds assists in cooling part 140 which is subsequently removed from the mold by opening second mold portion 138 after a predetermined time period has elapsed. A coolant return header 142 combines the coolant flow from each of the first, second, and third molds 38, 40, 42 and returns the combined flow to the coolant reservoir 120. A temperature of the coolant can also be separately controlled for distribution of coolant at different temperatures to different ones of the molds.

The plurality of first, second, and third electrically controlled mold coolant isolation valves 130, 132, 134, can be individually controlled to establish individual coolant flow paths. A first coolant flow path in communication with the first part mold 38 includes first mold supply line 124, first mold coolant isolation valve 130, and coolant return header 142. A second coolant flow path in communication with the second part mold 40 includes second mold supply line 126, second mold coolant isolation valve 132, and coolant return header 142. A third coolant flow path in communication with the third part mold 42 includes third mold supply line 128, third mold coolant isolation valve 134, and coolant return header 142. A flow rate of coolant 118 is controllable to any one of the first, second, or third molds 38, 40, 42 by control of at least one of the plurality of coolant valves isolation valves 130, 132, 134.

In several embodiments, because the molds are sequentially filled for example from the first to the second and finally to the third mold 38, 40, 42, the part 140 in the first mold 38 can cool faster than a corresponding part 140" in the third mold 42. To provide even cooling rates among the various parts 140, in addition to varying a temperature of the coolant, flow of coolant 118 can also be controlled by the first, second, or third mold coolant isolation valves 130, 132, 134 permitting greater or less coolant flow to individual ones of the molds so parts 140 in any of the molds cool at a predetermined rate to maintain consistency between parts.

The additional pressure boost provided by the use of multiple accumulators of the present disclosure permits the molding machine 12 to be reduced in size. For example, to simultaneously inject approximately three to five pounds of polymeric material into several molds in less than one second in a single injection stage, a press of approximately 3000 to 4000 tons is required. However, even a press of this size cannot ensure that the desired part density can be achieved because at the end of the injection stroke the speed of the injection device without the use of separate accumulators slows down. A press of this size includes a large injector mass, which is difficult to start and stop rapidly and can lose velocity toward the end of the injection stroke if multiple molds are simultaneously filled. In contrast, using the injection molding system 10 of the present disclosure, a press size of approximately 650 tons can be used for a similar injection mass of 3 to 5 pounds of polymeric material. The injection molding system 10 of the present disclosure also provides for the use of multiple molds in a single injection cycle divided into successive injection stages, each mold receiving a portion of mixture at a rapid injection rate to produce low density foamed/polymeric parts. The injection molding system of the present disclosure also offers the option of producing different parts in different ones of the molds during the same operational cycle. This increases the flexibility of the system while reducing the number of operational cycles required to produce a plurality of parts.

Control system 113 can also include a plurality of sensors (not shown), for example sensors to determine the position of injection molding screw 32, temperature and pressure of mixture 30, hydraulic system pressure in various locations of hydraulic system 46 including pressure in the accumulators, coolant flow rate and/or temperature in various locations of cooling system 114 including temperature of the molds, valve positions, mold open/closed condition, etc. Sensors for these measurements are known and are therefore not discussed further herein. The outputs of the various sensors are connected to control system 113, which can be programmed to adjust various components such as coolant flow or temperature, valve position, mixture temperature, etc. Control system 113 can function in several embodiments by using the initial position of injection molding screw 32 as a basis for determining the position of injection molding screw 32 in each of the injection positions. In alternative methods, control system 113 can also use the absolute position of injection molding screw 32 to determine requirements for each successive injection position. Control system 113 can also be programmed to prevent injection of mixture 30 into either of second or third molds 40, 42 if desired, or to prevent injection into third mold 42 if only first and second molds 38, 40 are used.

The injection molding system 10 of the present disclosure is not limited to the quantity of molds and accumulators disclosed herein. Additional or fewer ones of the molds and/or accumulators can also be used. Increasing the quantity of components however, also increases the complexity and costs of the system which must be compared to the per part costs achieved from the use of a less complex system. Polymeric/foam parts created by the injection molding system of the present disclosure can be created in a cycle time of approximately 60 seconds or less defined from the start of operation or fill of the screw section 14 to the removal of the cooled parts from the molds, and return to the start of operation. This includes a recharging time of approximately 20 to 40 seconds to refill and heat the screw section 14, plus accumulator recharging time following each displacement of injection molding screw 32. The use of coolant to force cool the individual molds helps achieve this overall cycle time to produce the individual parts. The temperature and flow rate of the coolant can also be varied by the injection molding system of the present disclosure to achieve consistent cooling rates for the individual parts in the individual molds.

It will be understood by those skilled in the art that the configuration of the hydraulic system 46 and the cooling system 114 described herein are provided for example only. The injection molding system 10 of the present invention is not limited by the specific configuration of components presented, and alternate configurations, including additional or fewer valves, pipes, and different flow paths can be used within the spirit and scope of the present disclosure. In several embodiments, an individual accumulator can be used for each injection position, with additional valves and piping installed to allow operation of each specific accumulator. Additional operating complexity and costs are incurred for this option, however reduced cycles of operation are incurred for the second and later accumulators if they are not operated during every cycle of operation of injection molding system 10.

Injection molding system 10 of the present disclosure offers several advantages. By incorporating a plurality of molds in a single injection molding machine, multiple parts can be manufactured in a single cycle of operation. To provide the necessary injection speeds to reduce the density of the foamed/polymeric parts, a plurality of accumulators are used to inject small amounts of hydraulic fluid together with operation of a hydraulic pump which permit the injection molding screw of the molding machine to be displaced in relatively small increments at very fast injection speeds of less than 1.0 seconds and in several embodiments to 0.5 seconds or less. Because multiple accumulators can be used instead of a single large accumulator, the accumulators can be rapidly recharged and/or discharged. Rapid charging/discharging also reduces the component sizes of overall hydraulic system of injection molding system 10.

The description of the present disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A method for creating foamed polymeric parts using a resin/blowing agent mixture, an injection molding machine having an injection molding screw section including a screw thread positioned in a screw section, a plurality of accumulators, a hydraulic pump, a plurality of isolation valves, and a plurality of molds, the method comprising:
   combining a resin and a blowing agent in the screw section and a receiving portion of the screw section creating a volume of a resin/blowing agent mixture;
   inititally charging the hydraulic accumulators using the hydraulic pump:
   aligning both a discharge of the hydraulic pump and a discharge line of the initially charged accumulators with the injection molding screw using the isolation valves including a header flow control valve operating to allow flow of hydraulic fluid through a hydraulic injection header to control an axial injection position of the injection molding screw;
   simultaneously operating the hydraulic pump and discharging the initially charged accumulators to use a hydraulic pressure of both the hydraulic pump and the initially charged accumulators to incrementally axially translate the injection molding screw to a first successive one of a plurality of injection positions to inject a first portion of the mixture into a first one of the molds at the first one of the plurality of injection positions;

realigning the valves including shutting the header flow control valve to isolate the injection molding screw from the hydraulic pump and the accumulators and to discharge hydraulic fluid from the hydraulic pump to the accumulators to refill and thereby recharge the accumulators using the hydraulic pump;

filling the accumulators for a period of approximately 1 to 5 seconds to provide fully recharged accumulators;

further realigning the valves after the 1 to 5 second period required to recharge the accumulators and opening the header flow control valve to direct flow of both the hydraulic pump and the accumulators together into the injection molding screw section;

simultaneously operating the hydraulic pump and discharging the recharged accumulators to use the hydraulic pressure of both the hydraulic pump and the recharged accumulators again through the hydraulic injection header to incrementally axially translate the injection molding screw from the first successive one to a second successive one of the plurality of injection positions to inject a second portion of the mixture into a second one of the molds at the second of the plurality of injection positions.

2. The method of claim 1, further comprising performing the realigning step to charge the accumulators by opening an electrically controlled charging line isolation valve of the plurality of isolation valves in an accumulator charging line to provide fluid communication between the hydraulic pump and the accumulators and closing an electrically controlled isolation valve of the plurality of isolation valves in an accumulator discharge line.

3. The method of claim 2, further comprising performing the further realigning step by closing the charging line isolation valve in the accumulator charging line and opening the isolation valve in the accumulator discharge line.

4. The method of claim 1, further comprising controlling the steps of simultaneously operating the hydraulic pump and discharging the accumulators to retain a constant filling time for each of the first and second ones of the molds.

5. The method of claim 1, further comprising maintaining the mixture in a heated and liquefied condition in the screw section and the receiving portion by continued operation of a heating device to continuously heat the mixture until all of the volume of the mixture has been ejected from the receiving portion in the injecting steps.

6. The method of claim 1, further comprising:
individually controlling a temperature of a coolant for distribution of the coolant at different temperatures to different ones of the molds;
operating electrically controlled mold coolant isolation valves to establish individual coolant flow paths to each of the molds; and
varying a flow rate of coolant to any one of the molds by control of at least one of the coolant valves isolation valves.

7. The method of claim 1, further comprising:
stopping rotation of the injection molding screw following heating of the mixture creating a predetermined volume of the mixture in the receiving portion.

8. The method of claim 1, further comprising transferring the mixture from the screw section through a one-way valve flow device into the receiving portion to prevent backflow of the mixture to the screw section.

9. The method of claim 1, further comprising varying a screw displacement to create multiple different injection displacements, each corresponding to a different partial volume of the mixture required to fill one of the molds.

10. The method of claim 1, further comprising maintaining a common screw displacement to create multiple common injection displacements, each corresponding to a common partial volume of the mixture required to fill one of the molds.

11. The method of claim 1, further comprising filling all the molds in individual stages from the volume of the mixture defining a single operation.

12. The method of claim 1, further comprising operating a press having a size of approximately 650 tons to inject the volume of a resin/blowing agent mixture including a mass of approximately 3 to 5 pounds of polymeric material.

* * * * *